(12) United States Patent
Vijayasankar et al.

(10) Patent No.: US 8,913,495 B2
(45) Date of Patent: Dec. 16, 2014

(54) FLOW CONTROL FOR POWERLINE COMMUNICATIONS

(75) Inventors: Kumaran Vijayasankar, Dallas, TX (US); Ramanuja Vedantham, Allen, TX (US); Anand G. Dabak, Plano, TX (US); Tarkesh Pande, Dallas, TX (US); Il Han Kim, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 13/529,146

(22) Filed: Jun. 21, 2012

(65) Prior Publication Data

US 2012/0327770 A1 Dec. 27, 2012

Related U.S. Application Data

(60) Provisional application No. 61/499,555, filed on Jun. 21, 2011, provisional application No. 61/499,418, filed on Jun. 21, 2011, provisional application No. 61/499,357, filed on Jun. 21, 2011.

(51) Int. Cl.
| | |
|---|---|
| *H04L 12/24* | (2006.01) |
| *H04L 12/825* | (2013.01) |
| *H04B 3/54* | (2006.01) |
| *H04L 12/801* | (2013.01) |
| *H04L 12/823* | (2013.01) |
| *H04L 12/835* | (2013.01) |

(52) U.S. Cl.
CPC ............... *H04L 47/266* (2013.01); *H04L 47/32* (2013.01); *H04L 47/30* (2013.01); *H04B 3/542* (2013.01); *Y02B 60/31* (2013.01); *H04B 2203/5408* (2013.01); *H04L 47/12* (2013.01); *H04L 47/127* (2013.01)
USPC ........................................................ 370/231

(58) Field of Classification Search
CPC ....... H04L 47/266; H04L 47/32; H04L 47/30; H04L 47/12; H04L 47/127; H04B 3/542; H04B 2203/5408; Y02B 60/31
USPC .................................................. 370/230, 231
See application file for complete search history.

(56) References Cited

U.S. PATENT DOCUMENTS

| | | | |
|---|---|---|---|
| 8,009,557 B2 * | 8/2011 | Curran-Gray et al. | 370/229 |
| 2003/0156542 A1 * | 8/2003 | Connor | 370/236 |
| 2009/0147685 A1 * | 6/2009 | Malhotra | 370/236 |
| 2010/0321168 A1 | 12/2010 | Sugawara | |
| 2011/0080834 A1 * | 4/2011 | Hirota et al. | 370/236 |

* cited by examiner

*Primary Examiner* — Melvin Marcelo
(74) *Attorney, Agent, or Firm* — Steven A. Shaw; Frederick J. Telecky, Jr.

(57) ABSTRACT

A method of powerline communications in a powerline communications (PLC) network including a first node and at least a second node. The first node transmits a data frame to the second node over a PLC channel. The second node has a data buffer for storing received information. The second node runs a flow control algorithm which determines a current congestion condition or a projected congestion condition of the data buffer based on at least one congestion parameter. The current congestion condition and projected congestion condition include nearly congested and fully congested. When the current or projected congestion condition is either nearly congested or fully congested, the second node transmits a BUSY including frame over the PLC channel to at least the first node. The first node defers transmitting of any frames to the second node for a congestion clearing wait time.

19 Claims, 3 Drawing Sheets

FLOW CONTROL FOR POWERLINE COMMUNICATIONS

CROSS REFERENCE TO RELATED APPLICATIONS

This application and the subject matter disclosed herein claims the benefit of Provisional Application Ser. Nos. 61/499,555, 61/499,418 and 61/499,357, all filed on Jun. 21, 2011, which are herein incorporated by reference in their entireties.

FIELD

Disclosed embodiments relate generally to the field of powerline communications, more particularly to flow control in powerline communication networks.

BACKGROUND

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

A PLC network includes a plurality of nodes, generally including a base (or concentrator) node and a plurality of service nodes (including switch nodes and terminal nodes) configured in a tree-like configuration. During network operation, some nodes in the PLC network may witness a high rate of incoming frames causing the conventional single data buffer which provides memory for both transmission data and reception data, or their receive buffer for separate transmission buffer and reception buffer embodiments, to become full. Once the data buffer for receiving data is full, the communication device at the node will not be able to receive any incoming frames sent from other network nodes, which will result in dropped frame(s), as well as the retransmission of the dropped frames by the sender node(s). A known data flow control (hereafter "flow control") mechanism used in conventional PLC networks involves having the sender node device defer its transmissions for a fixed period of time after the sender node receives an indication from the receiving node that the receive node's data buffer is full.

SUMMARY

One embodiment comprises a method of powerline communications in a powerline communications (PLC) network including a first node and at least a second node. The first node transmits a data frame to the second node over a PLC channel. The second node has a data buffer for storing received information. The second node runs a disclosed flow control algorithm which determines a current congestion condition or a projected congestion condition of the data buffer for receiving data based on at least one congestion parameter.

The current congestion condition and projected congestion condition include uncongested, nearly congested, and fully congested levels. When the current or projected congestion condition is either nearly congested or fully congested, the second node transmits a BUSY comprising frame over the PLC channel to at least the first node. Responsive to the BUSY comprising frame, the first node defers transmitting any frames to the second node for a congestion clearing (i.e. reducing) wait time. In one embodiment the BUSY comprising frame includes the congestion clearing wait time. Other disclosed embodiments include modems and communication devices implementing disclosed flow control algorithms.

BRIEF DESCRIPTION OF THE DRAWINGS

Reference will now be made to the accompanying drawings, which are not necessarily drawn to scale, wherein.

DETAILED DESCRIPTION

Figure 1:
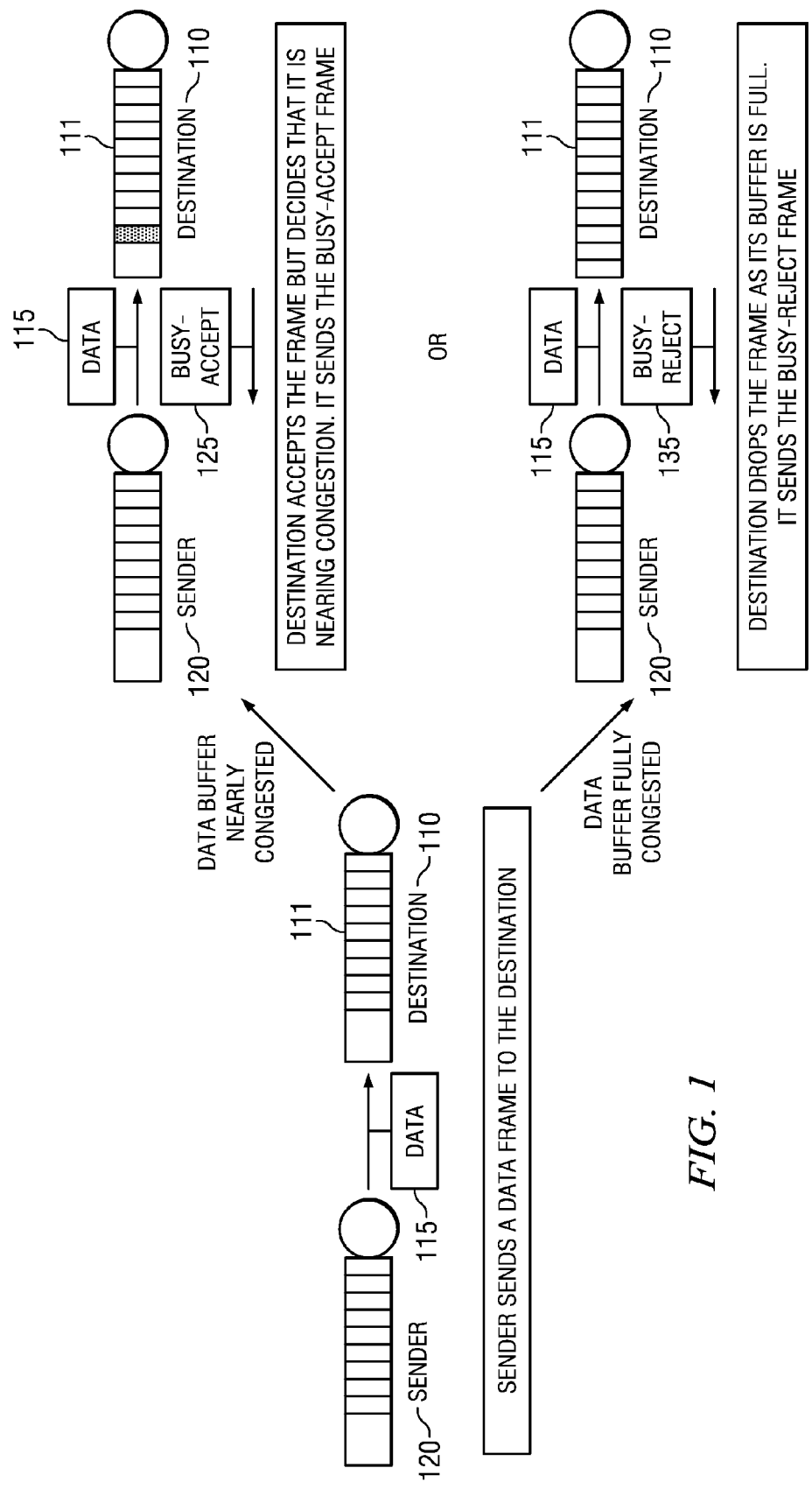
FIG. 1 shows a depiction of the workings of a disclosed flow control algorithm, according to an example embodiment.

Disclosed embodiments now will be described more fully hereinafter with reference to the accompanying drawings. Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection, unless qualified as in "communicably coupled" which includes wireless connections. Thus, if a first device couples to a second device, that connection may be through a direct electrical connection, or through an indirect electrical connection via other devices and connections.

In a first embodiment flow control algorithms are disclosed which dynamically sense the current congestion condition (e.g., level) of the data buffer for receiving data at the node to support the node when acting as a destination (receiving) node, and can also optionally determine the projected congestion level given the node's current congesting level and the node's scheduled net frame flux. If the current congestion level or projected congestion condition is at least at a predetermined nearly congested level (e.g., ≥80% or 90% full), the destination node can send a signal to the sender node(s) which delays their subsequent data frame transmissions to the destination node for a congestion clearing (i.e. reducing) wait time. A data buffer filling level below the nearly congested level can be considered uncongested.

Delayed frame transmissions proactively limit the destination node from experiencing incoming frame rates sufficient to cause its data buffer to become fully congested (i.e. 100% full) to avoid the loss of data, through use of a disclosed BUSY comprising frame including on one embodiment a BUSY-ACCEPT frame when at a nearly congested level, and a BUSY-REJECT frame when at a fully congested level. By reducing frame drops, disclosed flow control algorithms also reduce retransmission of dropped frames. Disclosed flow control algorithms can be used at base (or concentrator) nodes in the PLC network, or at service nodes including switch nodes and terminal nodes.

A node acting as a destination node in the PLC network can accept an incoming frame from a transmitting (sender) node if the destination node's data buffer for receiving data is not full, and can check whether the receive node's data buffer for receiving data is nearly congested based on the final data buffer size. The final data buffer size as used herein refers to a measure of the filling level of the data buffer for receiving data after storing the scheduled received data frame(s), and thus defines the remaining storage capacity of the data buffer. A disclosed flow control algorithm determines the current congestion condition and optionally the projected congestion condition (which considers the scheduled data frames to be received) based on one or more congestion parameters.

The congestion parameters can include the final data buffer size, and a scheduled net frame rate flux that considers the rate of scheduled outgoing frames from the node which frees buffer space if a single data buffer is used for transmission and reception data compared to the scheduled rate of incoming frames to the node. The destination node can obtain an estimate of the rate of incoming frames based on the weighted average of the incoming rate of past frames.

Regarding the final data buffer size, when the incoming frame(s) increases the final data buffer size beyond a predetermined threshold (e.g., the data buffer is ≥90% full) after receipt of the scheduled data frame(s), a nearly congested condition can be deemed to be present. The scheduled net frame rate flux can be a binary parameter, based on whether the scheduled arrival rate of frames >K*scheduled outgoing frame rate, where K can be chosen to be anywhere from 0 to less than 1. The scheduled net frame rate flux selected can be indicative of the flow control being active during which time the wait time is indicated to the transmitting node(s) to slow its frame transmission rate to the node having disclosed flow control assistance. During the time of flow control, the K value can be reduced from a value >1 (before flow control) to a value between 0 and 1 (during disclosed flow control).

As shown in the depiction of FIG. 1, if the flow control algorithm at the destination node 110 determines the destination node's data buffer for receiving data 111 is nearly congested, but not fully congested, the destination node 110 can proactively (i.e. before full congestion) send a BUSY-ACCEPT frame 125 to the sender node 120. The BUSY-ACCEPT frame 125 indicates to the sender node 120 that the destination node 110 has accepted the frame, but its data buffer 111 is nearly congested. If the received data frame 115 is received by the destination node 110 while its data buffer 111 is fully congested, the data frame will be dropped and a BUSY-REJECT frame 135 will be sent by the destination node 110 to the sender node 120.

The BUSY-ACCEPT frame 125 and BUSY-REJECT frame 135 can both comprise modified conventional acknowledgement (ACK) frames (i.e. an ACK frame having a preamble, and a PHY header), and can follow the same channel access procedure as for an ACK frame, where the ACK is transmitted after a Reduced Interframe Space (RIFS) duration following the reception of a frame by the intended receiver. There is generally no Carrier Sense Multiple Access (CSMA)/ Collision Avoidance (CA) performed. Disclosed BUSY-ACCEPT 125 and BUSY-REJECT frames 135 can be created using a special Delimiter Type (DT) in one of the ACK PHY header fields. The DT field can provide added information of the PHY frame being transmitted, including whether it is a DATA frame expecting ACK/NACK, ACK or NACK frame, and whether it is a BUSY-REJECT frame or BUSY-ACCEPT frame.

Upon reception of a BUSY-ACCEPT frame 125 or BUSY-REJECT frame 135, the sender node 120 can defer its frame transmissions to the destination node 110 until a congestion clearing wait time. The value of the congestion clearing wait time can be selected to be either a fixed (constant) system specific parameter, or can determined as a dynamic parameter using a dynamic algorithm, such as disclosed in the third embodiment described below.

In a second embodiment, a flow control algorithm includes a neighboring node alert mechanism which helps avoid the destination node's data buffer for receiving data 111 from becoming fully congested, including signaling that stops otherwise sender nodes in the neighborhood frames from sending frame(s) to the destination node 110 when the destination node's data buffer for receiving data is nearly or fully congested. The destination node 110 uses a disclosed flow control algorithm to dynamically sense the current congestion level of its data buffer 111, including whether the data buffer 111 is nearly congested or fully congested, as opposed to being uncongested.

Figure 2:
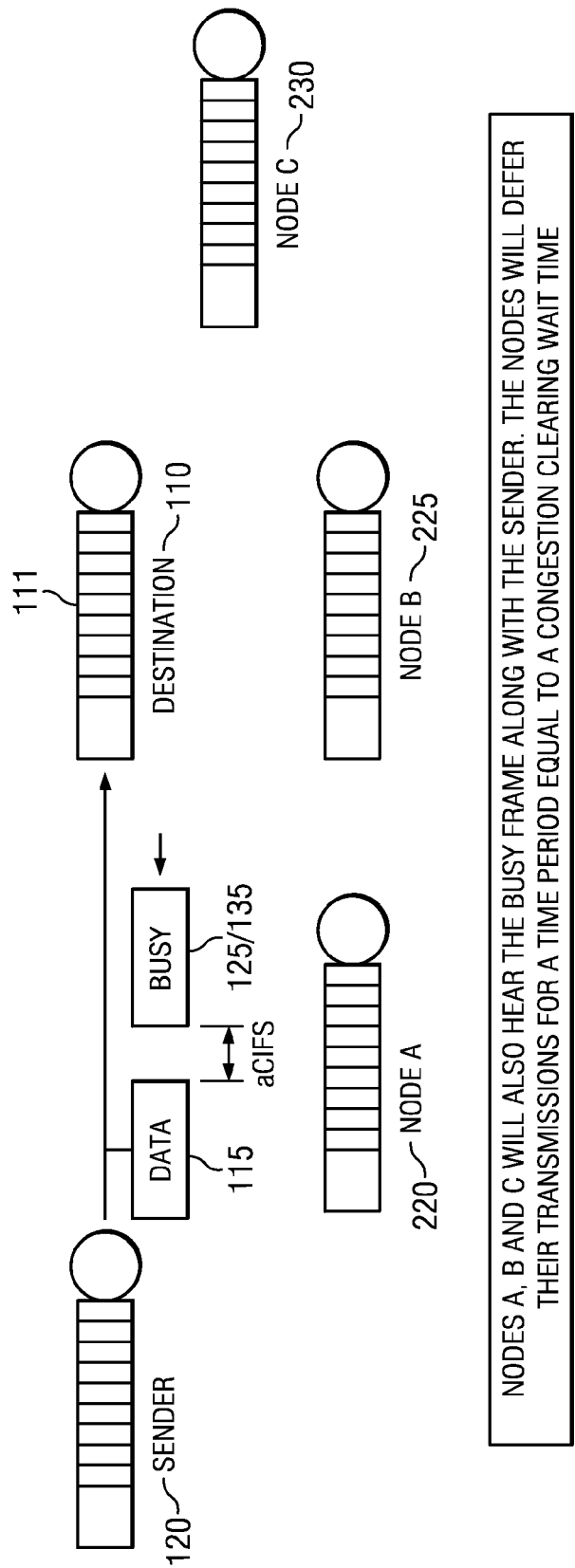
FIG. 2 shows a depiction of the workings of a disclosed flow control algorithm, according to another example embodiment.

FIG. 2 shows a depiction of the workings of a disclosed flow control algorithm, according to another example embodiment. When the destination node 110 receives the data frame 115 from the sender node 120, the destination node 110 can accept the data frame 115 if its data buffer for receiving data 111 is not fully congested, including when it is nearly congested, and drop the data frame 115 if it is fully congested. When a sender node 120 sends a data frame 115 to a destination node 110 in the case destination node's data buffer 111 is nearly congested or fully congested, the destination node 110 in this embodiment can send a BUSY comprising frame 125/135 after a contention interframe spacing (CIFS) time shown in FIG. 2 as "aCIFS" as it is referred to in the IEEE P1901.2 standard.

The neighborhood nodes shown as Node A 220, Node B 225 and Node C 230 also receive the BUSY comprising frame 125/135 (which can be a BUSY-ACCEPT frame 125 or BUSY-REJECT frame 135) along with the sender node. Responsive to the BUSY comprising frame 125/135, the neighborhood nodes, comprising Node A 220, Node B 225 and Node C 230, and the sender node 120, all defer their transmissions to the destination node 110 for a time period equal to the congestion clearing wait time. As described above, the BUSY comprising frame 125/135 can comprise a modified ACK frame and the channel access mechanism can be the mechanism used by a standard ACK frame.

Although disclosed BUSY comprising frames can be similar to standard ACK frames, one distinction is that disclosed BUSY comprising frames include information so that any node in the neighborhood of the destination node that receives the BUSY comprising frame can identify the destination node sending the BUSY comprising frame, such as based on information in the DT field as described above relative to the first embodiment. Responsive to the BUSY comprising frame the neighborhood nodes can defer their transmissions to the destination node for a time period equal to the congestion clearing wait time.

Since all nodes in the neighborhood of the destination node defer their transmissions to the destination node, if the destination node transmits during the congestion clearing wait time, such transmission(s) will clear memory space in its data buffer 111 (for the typical case of a single data buffer for both receive and transmit data), thus reducing the congestion level. As with the first embodiment, the value of the congestion clearing wait time may be system specific and constant, or can be determined dynamically based on the network conditions. This embodiment also helps to avoid wastage of PLC network resources that would have occurred when network nodes send their frames to a congested node when using known flow control methods.

Although a node may send a BUSY comprising frame, it cannot be guaranteed that every node in its neighborhood will successfully receive the BUSY comprising frame, as there may be a loss of BUSY comprising frame information, such as due to node collisions or frame error. In some embodiments, particularly environments prone to frame loss, the destination node when in the nearly congested or fully congested state can use the conventional ACK channel access procedure to transmit its next frame.

The following example options may be used by the destination node when in the nearly congested or fully congested condition to transmit its next data frame:

1. The destination node transmits the data frame immediately following its transmission of a BUSY comprising frame, separated only by an interframe space (IFS), shown in FIG. 2 as aCIFS.
2. The destination node can transmit the data frame, instead of an ACK or BUSY comprising frame, using the channel access mechanism of the ACK after receiving a frame while being in the fully congested state. The sender node will recognize the loss of the transmitted frame by the lack of the ACK frame from the destination node in response, and the destination node will be able to obtain contention-free access to the PLC channel to transmit frames to reduce congestion (for single data buffer embodiments).
3. The destination node can transmit its next data frame, instead of ACK or BUSY comprising frame, using the channel access mechanism of the ACK after receiving a frame while in the nearly congested or fully congested state. The sender can recognize whether their transmitted frame was received or not, by using a special field in a header of the frame (e.g., one of the DT reserved fields in the PHY header) sent by the destination node that indicates the success/failure of the sender node's earlier attempt to send a frame to the destination node. The sender node will not process the rest of the data frame if it was not sent to (addressed to) it. The destination node will then be able to obtain contention free access to the PLC channel to transmit frames to reduce congestion.

In a third embodiment, a flow control algorithm provides a dynamic method to determine the amount of congestion clearing wait time that the sender node(s) defers transmissions to a destination node based the current congestion level at the destination node together with the perceived network load referred to above as the net scheduled frame rate flux. For example, an estimate of the rate of incoming frames can be based on the weighted average of the incoming rate of past frames.

In PLC networks, a network wide Extended Inter frame Space (EIFS) is used to account for one single packet transmission time, where if the previously received frame contains an error, then the node defers for an EIFS duration before transmitting a frame. The congestion clearing wait time can be set to K*EIFS, where K is a constant. K is shown as an integer below based on IEEE P1901.2, but can also be a fraction for other or future PLC standards. The value of K can be specified in the BUSY comprising frame 125/135 sent by the destination node as described above for use to indicate that the data buffer at the destination node is at least nearly congested. In PLC standards such as IEEE P1901.2 networks, the PHY header is referred to as a frame control header (FCH), and the two bits [0 and 1] in the $8^{th}$ byte field of the FCH (Currently reserved) can be used to represent the value of K to allow the sender node(s) upon receipt of the BUSY comprising frame from the destination node to compute the congestion clearing wait time. An example set of K values obtained from a 2 bit pattern is shown in the Table below.

| Bit Pattern | K |
| --- | --- |
| 00 | 1 |
| 01 | 2 |
| 10 | 3 |
| 11 | 4 |

Higher K values can be used when the perceived network load for the destination node is higher, while lower K values can be used when the perceived network load (e.g. scheduled net frame flux) for the destination node is lower. This embodiment allows a receiving node to dynamically determine the congestion clearing wait time period based on its perceived traffic load, and transmit the dynamically determined congestion clearing wait time to other nodes in the PLC network. It is noted that more granularity in the choice of K can be obtained if more than 2 bits are allocated in the PHY header (e.g., FCH in IEEE P1901.2 networks) to represent the K value.

Figure 3:
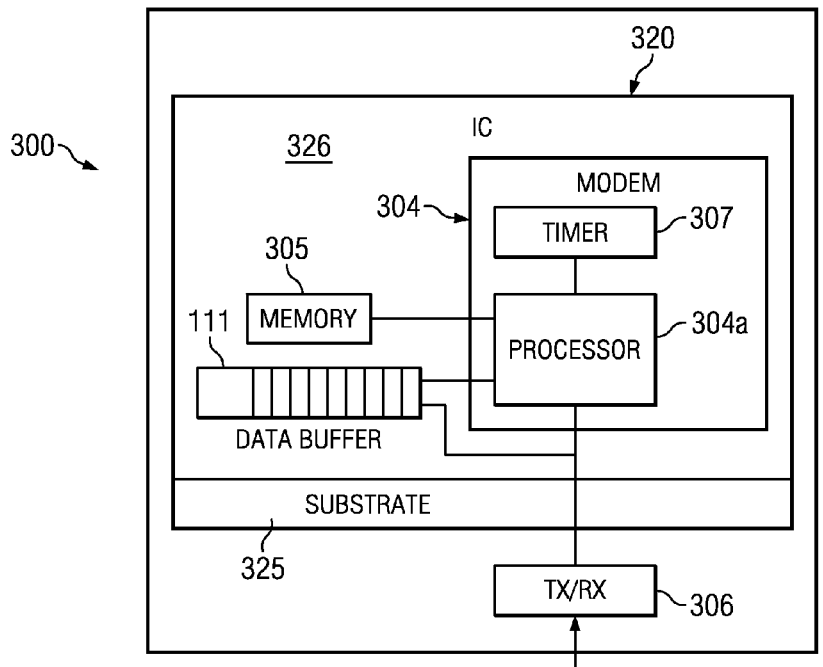
FIG. 3 is a block diagram schematic of a communication device having a disclosed modem that implements powerline communications using a disclosed flow control algorithm, according to an example embodiment.

FIG. 3 is a block diagram schematic of a communication device 300 having a disclosed modem 304 that implements powerline communications using a disclosed flow control algorithm, according to an example embodiment. Communication device 300 can be used at base (or concentrator) nodes in the PLC network, or at service nodes including switch nodes and terminal nodes.

Modem 304 includes a processor (e.g., a digital signal processor, (DSP)) 304a coupled to an associated memory 305 that that stores a disclosed flow control algorithm that may include any combination of the first, second and third embodiments described above, including the first, second and third embodiments in one particular embodiment, which provides code for the flow control algorithm. Memory 305 comprises machine readable storage, for example, static random-access memory (SRAM).

In operation, the processor 304a is programmed to implement the flow control algorithm. Communications device 300 is also shown including a data buffer 111 (which provides storage for both transmit data and received data) coupled to the processor 304a for storing received information from other nodes in the PLC network via PLC transceiver (TX/RX) 306. Although not shown, communications device 300 can include both a receive buffer and a reception buffer. Moreover, although shown as separate blocks, memory 305 and data buffer 111 may be provided by a single memory device having a partitionable memory. Modem 304 includes a timer 307, such as for ACK transmission, CSMA/CA back-off and data transmission purposes.

The PLC transceiver (TX/RX) 306 is communicably coupled to the modem 304 for coupling of the communications device 300 to the shared powerline 340. Transceiver 306 facilitates communications with other SNs and the BN on the powerline 340.

When the current or projected congestion condition is either nearly congested or fully congested, the modem 304 generally sends at least a trigger command to the PLC transceiver 306 to transmit a BUSY comprising frame over the powerline 340 (that provides a PLC channel) to at least one sender node in its neighborhood which is operable for the sender node to defer transmitting of any frames to the communications device 300 for a congestion clearing wait time.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

Figure 4:
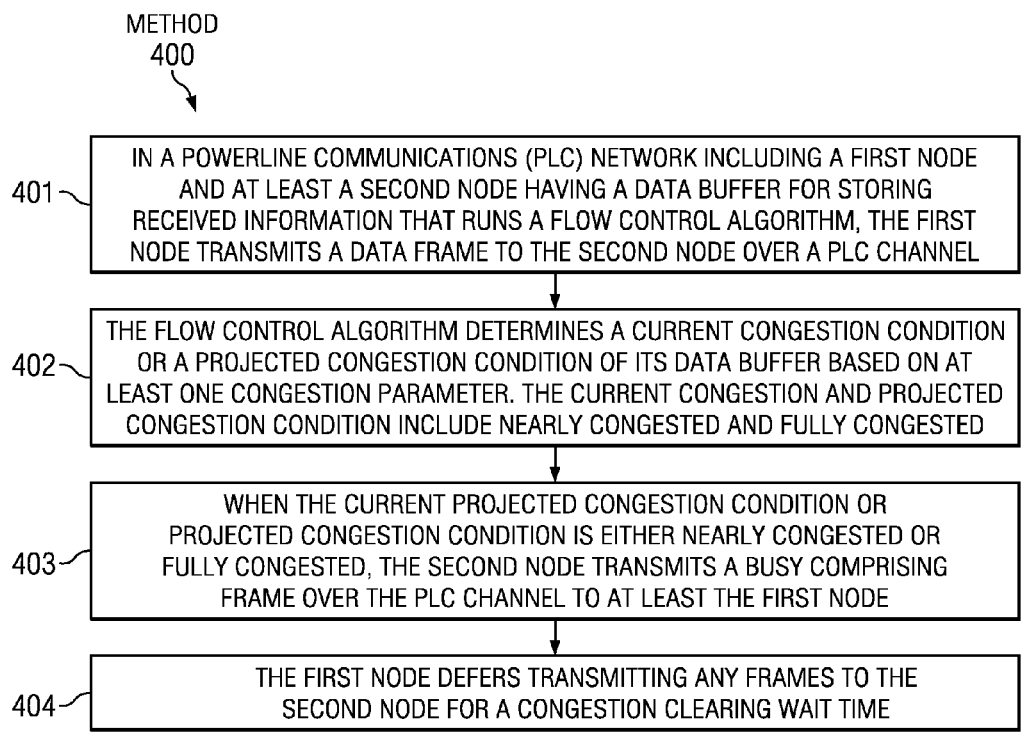
FIG. 4 is a flowchart for a method of powerline communications in a PLC network including a first node and at least a second node having a data buffer for storing received information that runs a disclosed flow control algorithm, according to an example embodiment.

FIG. 4 is a flowchart for an example method 400 of powerline communications in a PLC network including a first node and at least a second node having a data buffer for storing received information that runs a disclosed flow control algorithm, according to an example embodiment. In step 401, the first node transmits a data frame to the second node over a PLC channel.

In step 402 the flow control algorithm determines a current congestion condition or a projected congestion condition of its data buffer based on at least one congestion parameter. The current congestion condition and projected congestion condition include nearly congested, fully congested, and uncongested. In step 403, when the current projected congestion condition or projected congestion condition is either nearly congested or fully congested, the second node transmits a BUSY comprising frame over the PLC channel to at least the first node. As described above, the BUSY comprising frame can be a BUSY-ACCEPT frame 125 or a BUSY-REJECT frame 135. The BUSY comprising frame can include the congestion clearing wait time. Step 404 comprises the first node deferring transmitting of any frames to the second node for a congestion clearing wait time.

The congestion parameter can comprise a final data buffer size, and for conventional single data buffer embodiments a scheduled net frame rate flux parameter that considers a scheduled rate of outgoing frames from the second node compared to a scheduled rate of incoming frames to the second node. In one embodiment, if the flow control algorithm determines the current congestion condition or projected congestion condition is nearly congested, the second node accepts the data frame and the BUSY comprising frame comprises a BUSY-ACCEPT frame, and if the flow control algorithm determines the current congestion condition current is fully congested, the second node drops the data frame and the BUSY comprising frame comprises a BUSY-REJECT frame. The BUSY-ACCEPT frame and BUSY-REJECT frame can both be transmitted using a modified ACK frame having a field in a PHY header portion which includes information which distinguishes the modified ACK frame from a standard ACK frame, such as a DT field in a PHY header portion of the modified ACK frame as described above. The scheduled net frame rate flux parameter can comprise determining if the scheduled rate of incoming frames >K*the scheduled rate of outgoing frames, where 0<K<1.

As described above, the scheduled net frame rate flux selected can be indicative of the flow control being active during which time the congestion clearing wait time is indicated to the transmitting node(s) to slow its frame transmission rate to the node having disclosed flow control assistance. During the time of flow control, the K value can reduce from a value >1 (before disclosed flow control) to a value between 0 and 1 (during disclosed flow control).

In one embodiment the PLC network further comprises at least node A, wherein node A, the first node and second node are in a common neighborhood, and node A also receives the BUSY comprising frame and defers transmitting any frames to the second node for the congestion clearing wait time. In this embodiment, when the current congestion condition or projected congestion condition is either nearly congested or fully congested, and the destination node transmits its next data frame after the BUSY comprising frame either:

(i) following its transmission of the BUSY comprising frame after an interframe space (IFS), or (ii) as a modified ACK frame using a channel access mechanism for a standard ACK frame, where the next data frame has a field in a header portion (e.g., a DT field in a PHY header) that includes information which distinguishes the modified ACK frame from the standard ACK frame, or iii) as a modified ACK frame using the channel access mechanism for the standard ACK frame, where the next data frame has a first field in a header portion which includes information which distinguishes the modified ACK frame from the standard ACK frame and a second field in said header portion which indicates a success or failure of the first node's transmission of the data frame.

The second node can dynamically determines the congestion clearing wait time as a congestion clearing wait time variable including at least a higher value and a lower value. The higher value can be used when the scheduled net frame rate flux parameter is at a higher net frame rate flux, and the lower value used when the scheduled net frame rate flux parameter is at a lower net frame rate flux. The congestion clearing wait time can be set to set to K* an EIFS used in the PLC network, where K is selected from a set of constants and is specified in a field of a header portion of the BUSY comprising frame.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of powerline communications in a powerline communications (PLC) network including a first node and at least a second node, comprising:

said first node transmitting a data frame to said second node over a PLC channel, wherein said second node has a data buffer for storing received information;

said second node running a flow control algorithm which determines a current congestion condition or a projected congestion condition of said data buffer based on at least one congestion parameter, said current congestion condition and said projected congestion condition including nearly congested and fully congested;

wherein when said current projected congestion condition or said projected congestion condition is either said nearly congested or said fully congested:

said second node transmitting a BUSY comprising frame over said PLC channel to at least said first node, and said first node deferring transmitting of any frames to said second node for a congestion clearing wait time, wherein if said flow control algorithm determines said current congestion condition or said projected congestion condition is said nearly congested, said second node accepts said data frame and said BUSY comprising frame comprises a BUSY-ACCEPT frame, and wherein if said flow control algorithm determines said current congestion condition current is said fully congested, said second node drops said data frame and said BUSY comprising frame comprises a BUSY-REJECT frame.

2. The method of claim 1, wherein said BUSY-ACCEPT frame and said BUSY-REJECT frame are both transmitted using a modified acknowledgement (ACK) frame having a field in a header portion which includes information that distinguishes said modified ACK frame from a standard ACK frame.

3. The method of claim 1, wherein said BUSY comprising frame includes said congestion clearing wait time.

4. The method of claim 1, wherein said PLC network further comprises node A, wherein said node A, said first node and said second node are in a common neighborhood, said node A also receiving said BUSY comprising frame and deferring transmitting any frames to said second node for said congestion clearing wait time.

5. The method of claim 3, wherein said second node dynamically determines said congestion clearing wait time as a congestion clearing wait time variable including at least a higher value and a lower value.

6. The method of claim 5, wherein said congestion parameter comprising:

a final data buffer size; and a scheduled net frame rate flux parameter that considers a scheduled rate of outgoing frames from said second node compared to a scheduled rate of incoming frames to said second node, and wherein said higher value is used when said scheduled net frame rate flux parameter is at a higher net frame rate flux, and said lower value is used when said scheduled net frame rate flux parameter is at a lower net frame rate flux.

7. The method of claim 6, wherein said congestion clearing wait time is set to K* an Extended Inter frame Space (EIFS) used in said PLC network, where K is selected from a set of constants and is specified in a field of a header portion of said BUSY comprising frame.

8. A method of powerline communications in a powerline communications (PLC) network including a first node and at least a second node, comprising:

said first node transmitting a data frame to said second node over a PLC channel, wherein said second node has a data buffer for storing received information;

said second node running a flow control algorithm which determines a current congestion condition or a projected congestion condition of said data buffer based on at least one congestion parameter, said current congestion condition and said projected congestion condition including nearly congested and fully congested, wherein said congestion parameter comprising:

a final data buffer size;

a scheduled net frame rate flux parameter that considers a scheduled rate of outgoing frames from said second node compared to a scheduled rate of incoming frames to said second node;

wherein when said current projected congestion condition or said projected congestion condition is either said nearly congested or said fully congested:

said second node transmitting a BUSY comprising frame over said PLC channel to at least said first node, and said first node deferring transmitting of any frames to said second node for a congestion clearing wait time, wherein said scheduled net frame rate flux parameter comprises determining if said scheduled rate of said incoming frames >K*said scheduled rate of said outgoing frames, wherein 0<K<1.

9. A method of powerline communications in a powerline communications (PLC) network including a first node and at least a second node, comprising:

said first node transmitting a data frame to said second node over a PLC channel, wherein said second node has a data buffer for storing received information;

said second node running a flow control algorithm which determines a current congestion condition or a projected congestion condition of said data buffer based on at least one congestion parameter, said current congestion condition and said projected congestion condition including nearly congested and fully congested;

wherein when said current projected congestion condition or said projected congestion condition is either said nearly congested or said fully congested;

said second node transmitting a BUSY comprising frame over said PLC channel to at least said first node, and said first node deferring transmitting of any frames to said second node for a congestion clearing wait time, wherein when said current congestion condition or said projected congestion condition is either said nearly congested or said fully congested, said second node transmits its next data frame after said BUSY comprising frame either:

(i) following its transmission of said BUSY comprising frame after an interframe space (IFS), or (ii) as a modified acknowledgement (ACK) frame using a channel access mechanism for a standard ACK frame, said next data frame having a field in a header portion that includes information which distinguishes said modified ACK frame from said standard ACK frame, or (iii) as said modified ACK frame using said channel access mechanism for said standard ACK frame, said next data frame having said first field in said header portion which includes information which distinguishes said modified ACK frame from said standard ACK frame and a second field in said header portion which indicates a success or failure of said first node's transmission of said data frame.

10. A modem for communications on a powerline communications (PLC) channel in a PLC network including a first and at least a second node, comprising:

a processor at said second node, said second node having a data buffer for storing received information, wherein said processor is coupled to access data stored in a memory comprising machine readable storage which stores a flow control algorithm, and wherein said processor is programmed to implement said flow control algorithm responsive to said first node transmitting a data frame to said second node over said PLC channel, said flow control algorithm:

determining a current congestion condition or a projected congestion condition of said data buffer based on at least one congestion parameter, said current congestion condition and said projected congestion condition including nearly congested and fully congested; and when said current or projected congestion condition is either said nearly congested or said fully congested, sending at least a trigger command to have a PLC transceiver communicably coupled to said modem transmit a BUSY comprising frame over said PLC channel to at least said first node which is operable for said first node to defer transmitting of any frames to said second node for a congestion clearing wait time, wherein when said current congestion condition or said projected congestion condition is either said nearly congested or said fully congested, said second node transmits its next data frame after said BUSY comprising frame either:
  (i) following its transmission of said BUSY comprising frame after an inter frame space (IFS), or
  (ii) as a modified acknowledgement (ACK) frame using a channel access mechanism for said standard ACK frame, said next data frame having a field in a header portion that includes information which distinguishes said modified ACK frame from a standard ACK frame, or
  iii) as a modified ACK frame using said channel access mechanism for said standard ACK frame, said next data frame having said first field in said header portion which includes information which distinguishes said modified ACK frame from said standard ACK frame and a second field in said header portion which indicates a success or failure of said first node's transmission of said data frame.

11. The modem of claim 10, wherein said modem is formed on an integrated circuit (IC) comprising a substrate having a semiconductor surface, and wherein said processor comprises a digital signal processor (DSP).

12. The modem of claim 10, wherein said congestion parameter comprises a final data buffer size, and a scheduled net frame rate flux parameter that considers a scheduled rate of outgoing frames from said second node compared to a scheduled rate of incoming frames to said second node.

13. The modem of claim 10, wherein said BUSY comprising frame includes said congestion clearing wait time.

14. The modem of claim 13, wherein said second node dynamically determines said congestion clearing wait time as a congestion clearing wait time variable including at least a higher value and a lower value.

15. A communications device for communications on a powerline communications (PLC) channel in a PLC network including a first node and at least a second node, comprising:
  a modem including a processor at said second node,
    a PLC transceiver communicably coupled to said modem;
      a data buffer for storing received information coupled to said processor;
    a memory comprising machine readable storage which stores a flow control algorithm, wherein said processor is coupled to access data stored in said memory, and wherein said processor is programmed to implement said algorithm responsive to said first node transmitting a data frame to said second node over said PLC channel, said flow control algorithm:
      determining a current congestion condition or a projected congestion condition of said data buffer based on at least one congestion parameter, said current congestion condition and said projected congestion condition including nearly congested and fully congested;
      wherein said current or projected congestion condition is either said nearly congested or said fully congested, sending at least a trigger command to have said PLC transceiver transmit a BUSY comprising frame over said PLC channel to at least said first node which is operable for said first node to defer transmitting of any frames to said second node for a congestion clearing wait time,
      wherein said current congestion condition or said projected congestion condition is either said nearly congested or said fully congested, and wherein said second node transmits its next data frame after said BUSY comprising frame either:
        (i) following its transmission of said BUSY comprising frame after an inter frame space (IFS), or
        (ii) as a modified acknowledgement (ACK) frame using a channel access mechanism for said standard ACK frame, said next data frame having a field in a header portion that includes information which distinguishes said modified ACK frame from a standard ACK frame, or
        iii) as a modified ACK frame using said channel access mechanism for said standard ACK frame, said next data frame having said first field in said header portion which includes information which distinguishes said modified ACK frame from said standard ACK frame and a second field in said header portion which indicates a success or failure of said first node's transmission of said data frame.

16. The communications device of claim 15, wherein said modem is formed on an integrated circuit (IC) comprising a substrate having a semiconductor surface, and wherein said processor comprises a digital signal processor (DSP).

17. The communications device of claim 15, wherein said congestion parameter comprises a final data buffer size, and a scheduled net frame rate flux parameter that considers a scheduled rate of outgoing frames from said second node compared to a scheduled rate of incoming frames to said second node.

18. The communications device of claim 15, wherein said BUSY comprising frame includes said congestion clearing wait time.

19. The communications device of claim 15, wherein said second node dynamically determines said congestion clearing wait time as a congestion clearing wait time variable including at least a higher value and a lower value.

* * * * *